(12) United States Patent
Gu

(10) Patent No.: US 12,326,647 B2
(45) Date of Patent: Jun. 10, 2025

(54) CAMERA DEVICE

(71) Applicant: SAMSUNG ELECTRO-MECHANICS CO., LTD., Suwon-si (KR)

(72) Inventor: Wonseo Gu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 128 days.

(21) Appl. No.: 18/180,467

(22) Filed: Mar. 8, 2023

(65) Prior Publication Data
US 2023/0384654 A1  Nov. 30, 2023

(30) Foreign Application Priority Data
May 24, 2022  (KR) .................. 10-2022-0063633

(51) Int. Cl.
*G03B 17/02*  (2021.01)

(52) U.S. Cl.
CPC .................... *G03B 17/02* (2013.01)

(58) Field of Classification Search
None
See application file for complete search history.

(56) References Cited

U.S. PATENT DOCUMENTS

| | | | | |
|---|---|---|---|---|
| 2008/0008468 A1* | 1/2008 | Ma | .................. | H04N 23/54 396/529 |
| 2009/0166781 A1 | 7/2009 | England | | |
| 2011/0096224 A1* | 4/2011 | Lee | .................. | H04N 23/57 348/E5.025 |
| 2013/0329054 A1* | 12/2013 | Hoelter | ................ | H04N 23/23 348/164 |
| 2014/0043519 A1* | 2/2014 | Azuma | ................. | H04N 23/51 359/823 |
| 2014/0063821 A1* | 3/2014 | Hegde | ................ | H04N 23/57 361/728 |
| 2014/0160324 A1* | 6/2014 | Kim | ..................... | H04N 23/57 348/250 |
| 2018/0198897 A1 | 7/2018 | Tang et al. | | |
| 2021/0118800 A1 | 4/2021 | Jung | | |

FOREIGN PATENT DOCUMENTS

| | | |
|---|---|---|
| JP | 2020-509628 A | 3/2020 |
| KR | 10-2010-0109540 A | 10/2010 |
| KR | 20100112810 A * | 10/2010 |
| KR | 10-2011-0120011 A | 11/2011 |
| KR | 10-2021-0045876 A | 4/2021 |

OTHER PUBLICATIONS

Korean Office Action issued on Jan. 30, 2024, in counterpart Korean Patent Application No. 10-2022-0063633 (4 pages in English, 4 pages in Korean).
Korean Office Action issued on Oct. 15, 2024, in counterpart Korean Patent Application No. 10-2022-0063633 (2 pages in English, 3 pages in Korean).
Korean Notice of Allowance issued on Feb. 26, 2025, in corresponding Korean Patent Application No. 10-2022-0063633. (1page in English, 2pages in Korean).

* cited by examiner

*Primary Examiner* — Rodney E Fuller
(74) *Attorney, Agent, or Firm* — NSIP Law

(57) ABSTRACT

A camera device includes a shield portion configured to shield a camera module, a bracket configured to accommodate the shield portion, and a connection portion having conductivity, configured to connect an outer surface of the shield portion and an outer surface of the bracket.

20 Claims, 9 Drawing Sheets

CAMERA DEVICE

CROSS-REFERENCE TO RELATED APPLICATION

This application claims the benefit under 35 USC 119(a) of Korean Patent Application No. 10-2022-0063633 filed in the Korean Intellectual Property Office on May 24, 2022, the entire disclosure of which are incorporated herein by reference for all purposes.

BACKGROUND

1. Field

The present disclosure relates to a camera device.

2. Description of the Related Art

With the remarkable development of information communication technology and semiconductor technology, the dissemination and use of electronic devices are rapidly increasing. Such an electronic device tends to provide various functions by convergence rather than staying in its traditional unique area.

Recently, cameras have been adopted in portable electronic devices such as smartphones, tablet PCs, and laptop computers. These portable electronic devices include an auto focus (AF) function, an image stabilization (IS) function, and a zoom function.

The camera module is disposed in a shield portion such as a shield can or a shield case to protect it from external interference (i.e., electromagnetic interference, EMI), and can be mounted on an electronic device using a bracket.

In this case, it is possible to ensure the reliability of the camera module, such as protecting a circuit of the camera module from static electricity by electrically connecting the case and the bracket in which the camera module is assembled.

When electrically connecting the case and bracket of the camera module, a conductive bond or conductive tape may be used. However, when a conductive bond is used, the ground resistance may change depending on the composition of the bond. As a result, the conductive tape may lose adherence as time passes, resulting in a disconnected electrical connection. In addition, cost may increase when using a conductive bond or a conductive tape.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera device includes a shield portion configured to shield a camera module, a bracket configured to accommodate the shield portion, and a connection portion having conductivity, configured to connect an outer surface of the shield portion and an outer surface of the bracket.

The connection portion may include a metal wire or a wire ribbon.

One end of the connection portion may be bonded to the shield portion, and another end of the connection portion may be bonded to the bracket.

The one end and the other end of the connection portion may be bonded to the shield portion and the bracket by a wire bonding method.

The wire bonding method may be a wedge bonding method.

The connection portion may include at least one of aluminum (Al), copper (Cu), gold (Au), or silver (Ag), or any combination thereof.

The connection portion may be connected to an upper surface of the shield portion and an upper surface of the bracket.

A height of the upper surface of the shield portion may be substantially equal to a height of the upper surface of the bracket.

The connection portion may be connected to a side surface of the shield portion and a side surface of the bracket.

The connection portion may be connected to a groove in either one or both of upper surfaces of the shield portion and the bracket.

The groove may be in an upper surface of the bracket.

One end of the connection portion may be bonded to an inner surface of the groove.

The groove may be on an upper surface of the bracket and on a side surface of the bracket.

One end of the connection portion may be bonded to an inner surface of the groove.

The connection portion may be connected to a bottom surface of the shield portion and a bottom surface of the bracket.

The connection portion may be connected to a notch in either one or both of upper surfaces of the shield portion and the bracket.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
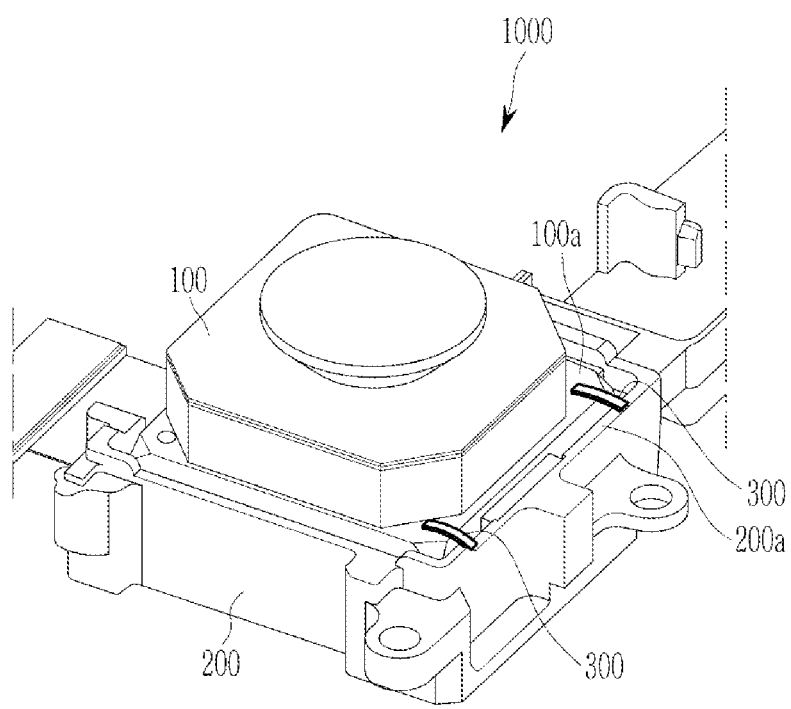
FIG. 1 is a perspective view of a part of a camera device according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Further, throughout the specification, when it is referred to as "planar", it means the case where a target part is viewed from above, and when it is referred to as "in a cross-section", it means the case where a cross-section obtained by vertically cutting the target part is viewed from the side.

Figure 2:
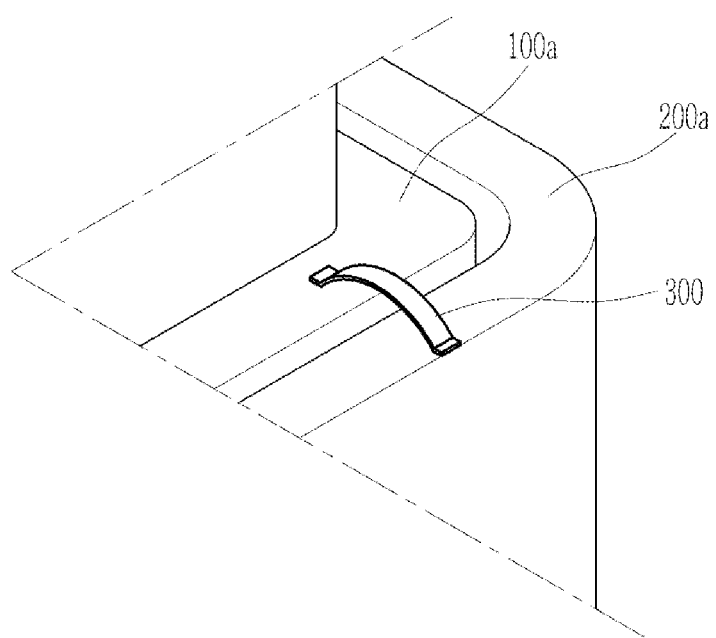
FIG. 2 is an enlarged view of a part of FIG. 1.

Referring to FIG. 1 and FIG. 2, a camera device according to one or more embodiments will be described. FIG. 1 is a perspective view of a part of a camera device according to one or more embodiments, and FIG. 2 is an enlarged view of a part of FIG. 1.

Referring to FIG. 1 and FIG. 2, the camera device 1000, according to the present embodiment, includes a shield portion 100 for shielding a camera module, a bracket 200 for accommodating the shield portion 100, and a connection portion 300 for connecting between the shield portion 100 and the bracket 200.

The shield portion 100 may include a metal. For example, the metal may be aluminum.

The shield portion 100 may accommodate a camera module, including at least one lens. A top surface of the shield portion 100 may be removed or may include a transparent window to allow a light source to be supplied to the lens.

The camera device 1000 may be mounted on the electronic device, and electromagnetic waves propagating from various modules mounted on the electronic device in addition to the camera device 1000 may cause malfunctions such as poor focus adjustment in the camera module. The shield portion 100 may protect the camera module mounted on the electronic device from external electromagnetic interference (EMI).

The bracket 200 accommodates the shield portion 100 and may be attached to the electronic device together with the shield portion 100. That is, the shield portion 100 may be assembled to the electronic device through the bracket 200.

An outer surface of the shield portion 100 and an outer surface of the bracket 200 may be electrically connected to each other through the connection portion 300.

The connection portion 300 may be conductive and include a metal wire or a wire ribbon. The connection portion 300 may include at least one of aluminum (Al), copper (Cu), gold (Au), or silver (Ag), or any combination thereof. However, the embodiment is not limited thereto, and the connection portion 300 may include another metal capable of being joined.

After assembling the shield portion 100 and the bracket 200, the shield portion 100 and the bracket 200 may be electrically connected through the connection portion 300 by connecting both ends of the connection portion 300 to the shield portion 100 and the bracket 200 through wire bonding, respectively. For example, using ultrasonic waves, wire bonding may use a wedge bonding method.

According to the present embodiment, in the camera device 1000, the connection portion 300 may be connected to a portion of an upper surface 100a of the shield portion 100 and a portion of an upper surface 200a of the bracket 200. The connection portion 300 may be provided in plural and disposed spaced apart from each other.

In this case, the height of the upper surface 100a of the shield portion 100 and the upper surface 200a of the bracket 200 to which the ends of the connection portion 300 are joined may be substantially the same. In this way, the shield portion 100 and the bracket 200 can be connected using the relatively short connection portion 300 by joining the ends of the connection portion 300 to the upper surface 100a of the shield portion 100 and the upper surface 200a of the bracket 200 having the same height.

The shield portion 100 may be grounded by being connected to a ground pad on a main circuit board on which the camera module is mounted, and electromagnetic waves generated from the outside may pass through the shield portion 100 and then be removed through the ground pad portion such that the generated electromagnetic waves may not affect the camera module accommodated inside the shield portion 100.

In addition, the bracket 200 can be electrically connected to the shield portion 100 through the connection portion 300, and electromagnetic waves generated from the outside can be transmitted to the shield portion 100 through the bracket 200 and the connection portion 300, and then removed through the ground pad portion.

In the camera device 1000, according to the present embodiment, the shield portion 100 and the bracket 200 are electrically connected through the connection portion 300, the connection portion 300 has conductivity and includes a metal wire or a wire ribbon, and the ends of the connection portion 300 are connected to the shield portion 100 and the bracket 200 through a wire bonding method, respectively.

As described, the width and thickness of the connection portion 300 can be maintained constant by forming the connection portion 300, electrically connecting the shield portion 100 and the bracket 200, with a metal wire or a wire ribbon connected by a wire bonding method such that constant resistance of the connection portion 300 is maintained. After assembling the shield portion 100 and the bracket 200, the connection portion 300 is bonded to the outer surface of the shield portion 100 and the outer surface of the bracket 200 through wire bonding, and thus the process is not complicated, and the frequency of occurrence of process errors can be reduced. In addition, it is possible to reduce the cost by forming the connection portion 300 with a metal wire or a wire ribbon.

Figure 3:
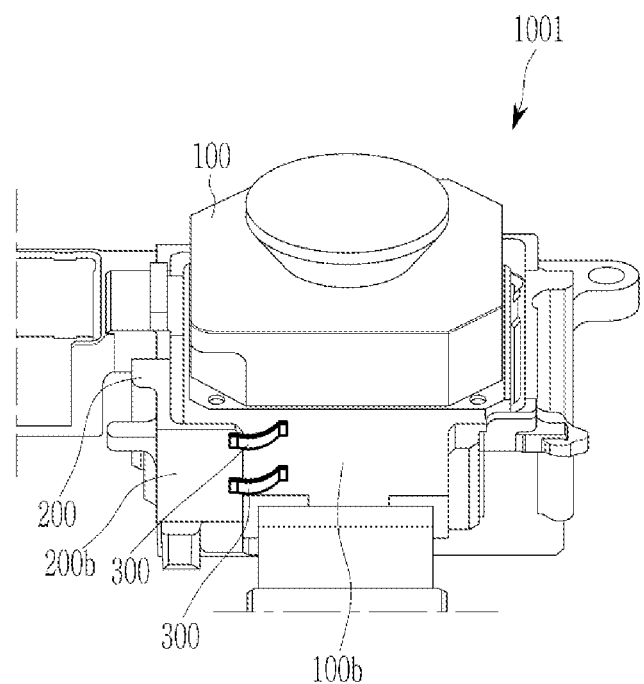
FIG. 3 is a perspective view of a part of a camera device according to another one or more embodiments.
Figure 4:
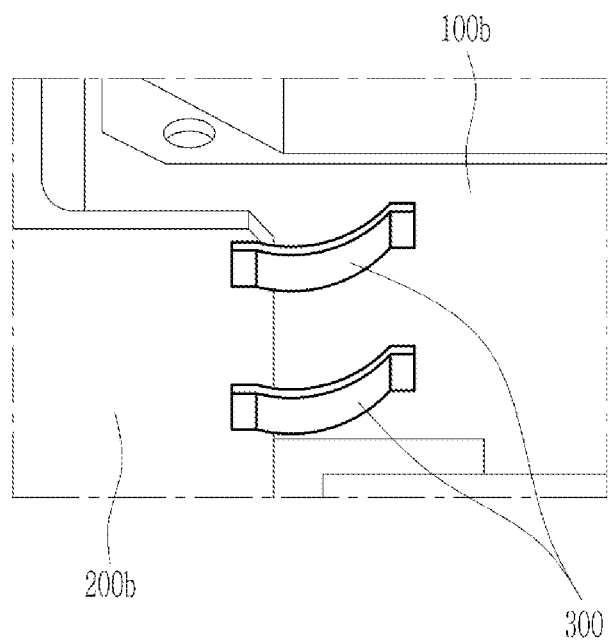
FIG. 4 is an enlarged view of a part of FIG. 3.

Referring to FIG. 3 and FIG. 4, a camera device 1001 according to another one or more embodiments will be described. FIG. 3 is a perspective view of a part of a camera device according to another one or more embodiments, and FIG. 4 is an enlarged view of a part of FIG. 3.

Referring to FIG. 3 and FIG. 4, similar to the camera device 1000 according to the embodiment described above with reference to FIG. 1 and FIG. 2, a camera device 1001 according to the present embodiment includes a shield portion 100 for shielding a camera module and a bracket 200 for accommodating the shield portion 100, and a connection portion 300 for connecting the shield portion 100 and the bracket 200 to each other.

The shield portion 100 may include a metal.

The shield portion 100 may accommodate a camera module, including at least one lens.

The bracket 200 accommodates the shield portion 100 and can be attached to the electronic device together with the shield portion 100.

An outer surface of the shield portion 100 and an outer surface of the bracket 200 may be electrically connected to each other through the connection portion 300.

The connection portion 300 may be conductive and include a metal wire or a wire ribbon, and the ends of the connection portion 300 may be connected to the shield portion 100 and the bracket 200 through a wire bonding method, respectively.

In the camera device 1001, according to the present embodiment, the connection portion 300 may be connected to a portion of a side surface 100b of the shield portion 100 and a portion of a side surface 200b of the bracket 200.

The bracket 200 and the shield portion 100 may be electrically connected through the connection portion 300, and electromagnetic waves generated from the outside are transmitted to the shield portion 100 through the bracket 200 and the connection portion 300, and then may be removed through a ground pad portion to which the shield portion 100 is connected.

The width and thickness of the connection portion 300 can be maintained constant by forming the connection portion 300 electrically connecting the shield portion 100 and the bracket 200 with a metal wire or a wire ribbon connected by a wire bonding method such that constant resistance of the connection portion 300 is maintained, and after assembling the shield portion 100 and the bracket 200, the connection portion 300 is bonded to the outer surface of the shield portion 100 and the outer surface of the bracket 200 through wire bonding, and thus the process is not complicated and frequency of occurrence of process errors can be reduced. In addition, it is possible to reduce the cost by forming the connection portion 300 with a metal wire or a wire ribbon.

Many features of the camera device 1000, according to the embodiment described with reference to FIG. 1 and FIG. 2, apply to the camera device 1001 according to the present embodiment.

Figure 5:
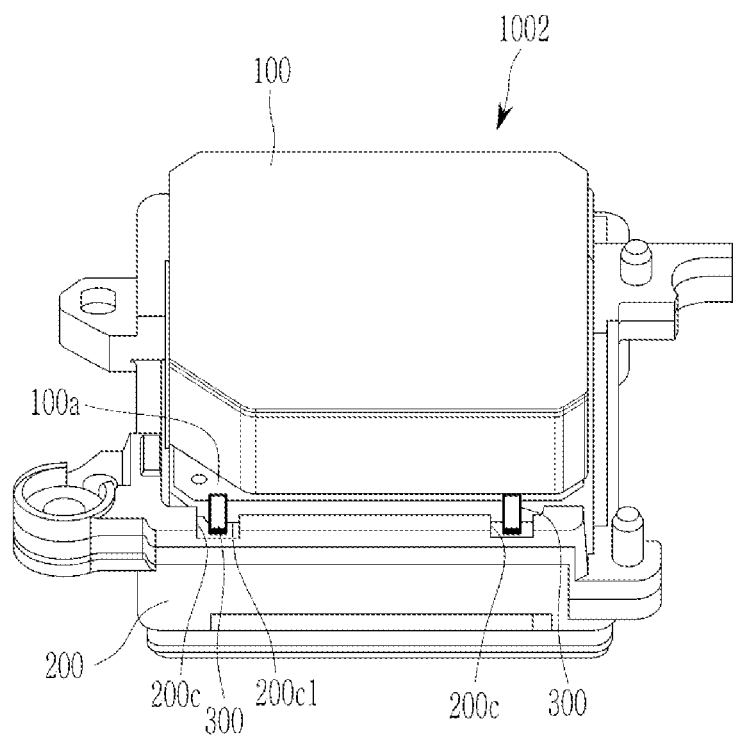
FIG. 5 is a perspective view of a part of a camera device according to another one or more embodiments.
Figure 6:
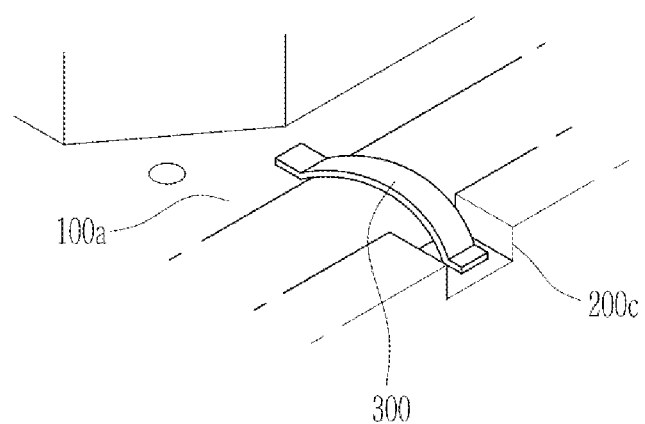
FIG. 6 is an enlarged view of a part of FIG. 5.

Referring to FIG. 5 and FIG. 6, a camera device 1002, according to another one or more embodiments, will be described. FIG. 5 is a perspective view of a part of a camera device according to another one or more embodiments, and FIG. 6 is an enlarged view of a part of FIG. 5.

Referring to FIG. 5 and FIG. 6, similar to the camera devices 1000 and 1001 according to the above-described embodiments, a camera device 1002, according to the present embodiment, includes a shield portion 100 for shielding a camera module and a bracket 200 for accommodating the shield portion 100, and a connection portion 300 for connecting the shield portion 100 and the bracket 200 to each other.

The shield portion 100 may include a metal.

The shield portion 100 may accommodate a camera module, including at least one lens.

The bracket 200 accommodates the shield portion 100 and can be attached to the electronic device together with the shield portion 100.

An outer surface of the shield portion 100 and an outer surface of the bracket 200 may be electrically connected to each other through the connection portion 300.

The connection portion 300 may be conductive and include a metal wire or a wire ribbon, and the ends of the connection portion 300 may be connected to the shield portion 100 and the bracket 200 through a wire bonding method, respectively.

In the camera device 1002, according to the present embodiment, a plurality of grooves (or notches) 200c may be in the upper surface 200a of the bracket 200, and the connection portion 300 may be connected to a portion of the upper surface 100a of the shield portion 100 and an inner surface 200c1 of the groove 200c in the upper surface 200a of the bracket 200.

One end of the connection portion 300 grounded to the bracket 200 is disposed in the groove 200c of the bracket 200 and the upper surface of the bracket 200. Thus the end portion grounded to the bracket 200 may not protrude above the upper surface 200a by connecting one end of the connection portion 300 to the inner surface 200c1 of the groove 200c in the upper surface 200a of the bracket 200. Through this, the state in which the connection portion 300 is held on the bracket 200 may be reliably maintained.

The bracket 200 and the shield portion 100 may be electrically connected through the connection portion 300, and electromagnetic waves generated from the outside are transmitted to the shield portion 100 through the bracket 200 and the connection portion 300, and then may be removed through the ground pad portion to which the shield portion 100 is connected.

The width and thickness of the connection portion 300 can be maintained to be constant by forming the connection portion 300 electrically connecting the shield portion 100 and the bracket 200 with a metal wire or a wire ribbon connected by a wire bonding method, and thus the resistance of the connection portion 300 is maintained constant. After assembling the shield portion 100 and the bracket 200, the connection portion 300 is bonded to the outer surface of the shield portion 100 and the outer surface of the bracket 200 through wire bonding such that the process is not complicated and the frequency of occurrence of process errors can be reduced. In addition, it is possible to reduce the cost by forming the connection portion 300 with a metal wire or a wire ribbon.

According to the embodiments described above, many features of the camera devices 1000 and 1001 are applicable to the camera device 1002 according to the present embodiment.

Figure 7:
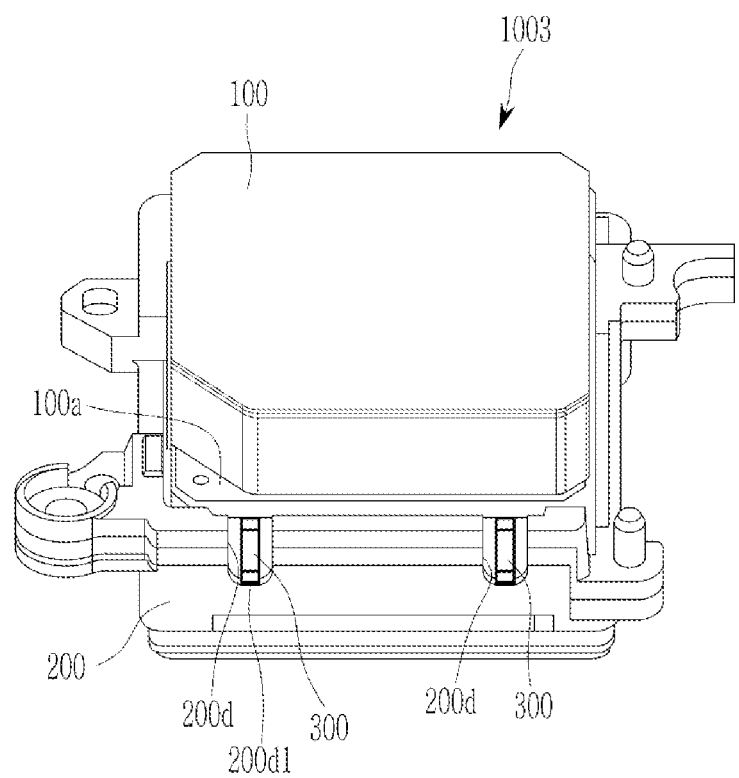
FIG. 7 is a perspective view of a part of a camera device according to another one or more embodiments.
Figure 8:
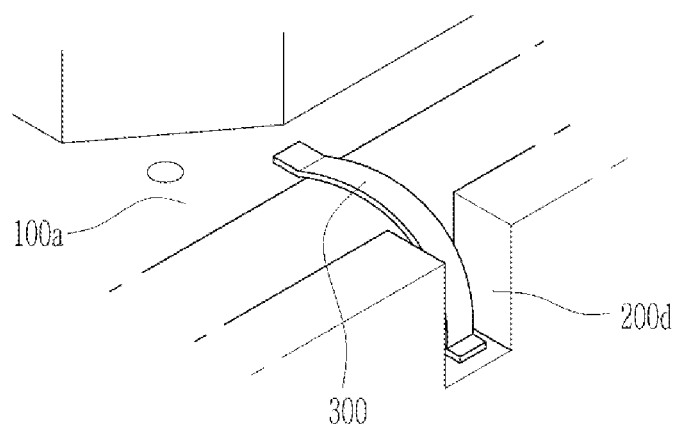
FIG. 8 is an enlarged view of a part of FIG. 7.

Referring to FIG. 7 and FIG. 8, a camera device 1003, according to another one or more embodiments, will be described. FIG. 7 is a perspective view of a part of a camera device according to another one or more embodiments, and FIG. 8 is an enlarged view of a part of FIG. 7.

Referring to FIG. 7 and FIG. 8, similar to the camera devices 1000, 1001, and 1002 according to the above-described embodiments, a camera device 1003, according to the present embodiment, includes a shield portion 100 for shielding a camera module and a bracket 200 for accommodating the shield portion 100, and a connection portion 300 for connecting the shield portion 100 and the bracket 200 to each other.

The shield portion 100 may include a metal.

The shield portion 100 may accommodate a camera module, including at least one lens.

The bracket 200 accommodates the shield portion 100 and can be attached to the electronic device together with the shield portion 100.

An outer surface of the shield portion 100 and an outer surface of the bracket 200 may be electrically connected to each other through the connection portion 300.

The connection portion 300 may be conductive and include a metal wire or a wire ribbon, and the ends of the connection portion 300 may be connected to the shield portion 100 and the bracket 200 through a wire bonding method, respectively.

In the camera device 1003, according to the present embodiment, a plurality of grooves (or notches) 200d that expands from an upper surface 200a to a side surface 200b of the bracket 200 are in the bracket 200 such that the connection portion 300 can be connected to inner surfaces 200d1 of the grooves 200d in the upper surface 200a and the side surface 200d of the bracket 200.

The end of the connection portion 300 grounded to the bracket 200 is disposed in the groove 200d of the bracket 200 and the upper surface of the bracket 200. Thus the end portion grounded to the bracket 200 may not protrude above the upper surface 200a by connecting one end of the connection portion 300 to the inner surface 200d1 of the groove 200d in the bracket 200. Through this, the state in which the connection portion 300 is held on the bracket 200 may be reliably maintained.

The bracket 200 and the shield portion 100 may be electrically connected through the connection portion 300, and electromagnetic waves generated from the outside are transmitted to the shield portion 100 through the bracket 200 and the connection portion 300, and then may be removed through the ground pad portion to which the shield portion 100 is connected.

The width and thickness of the connection portion 300 can be maintained to be constant by forming the connection portion 300 electrically connecting the shield portion 100 and the bracket 200 with a metal wire or a wire ribbon connected by a wire bonding method, and thus the resistance of the connection portion 300 is maintained constant. After assembling the shield portion 100 and the bracket 200, the connection portion 300 is bonded to the outer surface of the shield portion 100 and the outer surface of the bracket 200 through wire bonding such that the process is not complicated and the frequency of occurrence of process errors can be reduced. In addition, it is possible to reduce the cost by forming the connection portion 300 with a metal wire or a wire ribbon.

Many features of the camera devices 1000, 1001, and 1002 according to the embodiments described above, apply to the camera device 1003 according to the present embodiment.

Figure 9:
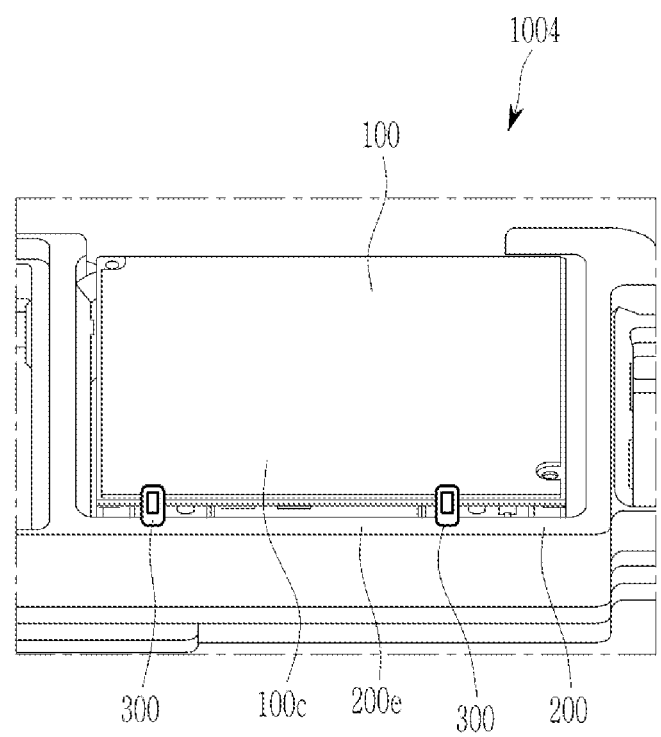
FIG. 9 is a perspective view of a part of a camera device according to another one or more embodiments.

Referring to FIG. 9, a camera device 1004, according to another one or more embodiments, will be described. FIG. 9 is a perspective view of a part of a camera device according to another one or more embodiments.

Referring to FIG. 9, similar to the camera devices 1000, 1001, 1002, and 1003 according to the above-described embodiments, a camera device 1004, according to the present embodiment, includes a shield portion 100 for shielding a camera module and a bracket 200 for accommodating the shield portion 100, and a connection portion 300 for connecting the shield portion 100 and the bracket 200 to each other.

The shield portion 100 may include a metal.

The shield portion 100 may accommodate a camera module, including at least one lens.

The bracket 200 accommodates the shield portion 100 and can be attached to the electronic device together with the shield portion 100.

An outer surface of the shield portion 100 and an outer surface of the bracket 200 may be electrically connected to each other through the connection portion 300.

The connection portion 300 may be conductive and include a metal wire or a wire ribbon, and the ends of the connection portion 300 may be connected to the shield portion 100 and the bracket 200 through a wire bonding method, respectively.

In the camera device 1004, according to the present embodiment, the connection portion 300 may be connected to a portion of a bottom surface 100c of the shield portion 100 and a portion of a bottom surface 200e of the bracket 200.

In this case, when the camera device 1004 is turned over, a height of the bottom surface 100c of the shield portion 100 to which the ends of the connection portion 300 are joined, and a height of the bottom surface 200e of the bracket 200 may be substantially equal to each other. In this way, the ends of the connection portion 300 to the bottom surface 100c of the shield portion 100 and the bottom surface 200e of the bracket 200 having the same height as each other are bonded to each other such that the shield portion 100 and the bracket 200 can be connected using the connection portion 300 having a relatively short length.

The bracket 200 and the shield portion 100 may be electrically connected through the connection portion 300, and electromagnetic waves generated from the outside are transmitted to the shield portion 100 through the bracket 200 and the connection portion 300, and then may be removed through the ground pad portion to which the shield portion 100 is connected.

The width and thickness of the connection portion 300 can be maintained to be constant by forming the connection portion 300 electrically connecting the shield portion 100 and the bracket 200 with a metal wire or a wire ribbon connected by a wire bonding method, and thus the resistance of the connection portion 300 is maintained constant. After assembling the shield portion 100 and the bracket 200, the connection portion 300 is bonded to the outer surface of the shield portion 100 and the outer surface of the bracket 200 through wire bonding such that the process is not complicated and the frequency of occurrence of process errors can be reduced. In addition, it is possible to reduce the cost by forming the connection portion 300 with a metal wire or a wire ribbon.

Many features of the camera devices 1000, 1001, 1002, and 1003 according to the embodiments described above apply to the camera device 1004 according to the present embodiment.

Hereinafter, an experimental example will be described with reference to Table 1. In the present experimental example, resistance values were measured with respect to a first case where a shield portion 100 and a bracket 200 were connected by applying a conductive bond (Case 1) and in a second case (Case 2) where a shield portion 100 and a bracket 200 were connected using a wire ribbon like the camera device according to the embodiment, and the results are shown in Table 1. In the present experimental example, a connection portion was formed 6 times each for the first case (Case 1) and the second case (Case 2).

TABLE 1

| Round  | 1    | 2    | 3    | 4   | 5    | 6    |
|--------|------|------|------|-----|------|------|
| Case 1 | 43.5 | 73.8 | 24.4 | 1.1 | 52.3 | 54.5 |
| Case 2 | 0.7  | 0.7  | 0.8  | 0.7 | 0.8  | 0.9  |

Referring to Table 1, in comparison with the first case of connecting the shield portion 100 and the bracket 200 by applying a conductive bond as in the prior art, like the camera device according to the embodiment, the deviation of the resistance value of the second case (case 2) of the connecting the shield portion 100 and the bracket 200 using a wire ribbon was not large.

The embodiments disclosed are directed to reliably electrically connecting a camera module and a bracket at a low cost.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera device comprising:
a shield portion configured to shield a camera module;
a bracket having a cavity configured to accommodate the shield portion; and
a connection portion having conductivity, configured to connect and extend from an outer surface of the shield portion and an outer surface of the bracket.

2. The camera device of claim 1, wherein
the connection portion comprises a metal wire or a wire ribbon.

3. The camera device of claim 2, wherein
one end of the connection portion is bonded to the shield portion, and
another end of the connection portion is bonded to the bracket.

4. The camera device of claim 3, wherein
the one end and the other end of the connection portion are bonded to the shield portion and the bracket by a wire bonding method.

5. The camera device of claim 4, wherein
the wire bonding method is a wedge bonding method.

6. The camera device of claim 3, wherein
the connection portion is connected to an upper surface of the shield portion and an upper surface of the bracket.

7. The camera device of claim 6, wherein
a height of the upper surface of the shield portion is substantially equal to a height of the upper surface of the bracket.

8. The camera device of claim 3, wherein
the connection portion is connected to a side surface of the shield portion and a side surface of the bracket.

9. The camera device of claim 3, wherein
the connection portion is connected to a groove in either one or both of upper surfaces of the shield portion and the bracket.

10. The camera device of claim 9, wherein
the groove is in an upper surface of the bracket.

11. The camera device of claim 10, wherein
one end of the connection portion is bonded to an inner surface of the groove.

12. The camera device of claim 9, wherein
the groove is on an upper surface of the bracket and on a side surface of the bracket.

13. The camera device of claim 12, wherein
one end of the connection portion is bonded to an inner surface of the groove.

14. The camera device of claim 3, wherein
the connection portion is connected to a bottom surface of the shield portion and a bottom surface of the bracket.

15. The camera device of claim 3, wherein
the connection portion is connected to a notch in either one or both of upper surfaces of the shield portion and the bracket.

16. The camera device of claim 2, wherein
the connection portion comprises at least one of aluminum (Al), copper (Cu), gold (Au), or silver (Ag), or any combination thereof.

17. The camera device of claim 1, wherein the shield portion is connected to a ground pad on a main circuit board.

18. The camera device of claim 1, wherein the connection portion is connected to a notch in either one or both of upper surfaces of the shield portion and the bracket.

19. A camera device comprising:
a shield portion configured to shield a camera module;
a bracket configured to accommodate the shield portion; and
a connection portion having conductivity, configured to connect a side surface of the shield portion and a side surface of the bracket.

20. A camera device comprising:
a shield portion configured to shield a camera module;
a bracket configured to accommodate the shield portion; and
a connection portion having conductivity, configured to connect an upper surface of the shield portion and an upper surface of the bracket,
wherein a height of the upper surface of the shield portion is substantially equal to a height of the upper surface of the bracket.

\* \* \* \* \*